US011956866B2

(12) United States Patent
Zoppas et al.

(10) Patent No.: US 11,956,866 B2
(45) Date of Patent: Apr. 9, 2024

(54) ELECTRIC HEATER FOR TANK

(71) Applicant: I.R.C.A. S.P.A. INDUSTRIA RESISTENZE CORAZZATE E AFFINI, Vittorio Veneto (IT)

(72) Inventors: Federico Zoppas, Treviso (IT); Stefano Zanella, Montebelluna (IT); Mario Eusebio, Pordenone (IT); Ivano Dal Cal, Susegana (IT); Maurizio Biasi, Fontanelle (IT)

(73) Assignee: I.R.C.A. S.P.A. INDUSTRIA RESISTENZE CORAZZATE E AFFINI, Vittorio Veneto (IT)

( * ) Notice: Subject to any disclaimer, the term of this patent is extended or adjusted under 35 U.S.C. 154(b) by 637 days.

(21) Appl. No.: 17/260,663

(22) PCT Filed: Jul. 19, 2019

(86) PCT No.: PCT/IB2019/056196
§ 371 (c)(1),
(2) Date: Jan. 15, 2021

(87) PCT Pub. No.: WO2020/016848
PCT Pub. Date: Jan. 23, 2020

(65) Prior Publication Data

US 2021/0267019 A1 Aug. 26, 2021

(30) Foreign Application Priority Data

Jul. 19, 2018 (IT) ........................ 102018000007339

(51) Int. Cl.
*H05B 3/82* (2006.01)
*H05B 3/30* (2006.01)

(52) U.S. Cl.
CPC ................. *H05B 3/82* (2013.01); *H05B 3/30* (2013.01); *F01N 2240/16* (2013.01); *H05B 2203/003* (2013.01); *H05B 2203/014* (2013.01)

(58) Field of Classification Search
CPC ...... H05B 3/82; H05B 3/30; H05B 2203/003; H05B 2203/014; F01N 2240/16; F01N 2610/10; F01N 2610/1406; F01N 2610/1486
See application file for complete search history.

(56) References Cited

U.S. PATENT DOCUMENTS 3,878,362 A * 4/1975 Stinger .................. H05B 3/146 338/211
5,047,786 A * 9/1991 Levy ....................... F24H 3/002 165/53
2013/0186885 A1* 7/2013 Hoffstaedter ........ B23K 20/023 219/544

* cited by examiner

*Primary Examiner* — Robert G Bachner
(74) *Attorney, Agent, or Firm* — Amster, Rothstein & Ebenstein LLP

(57) ABSTRACT

An electric heater (1, 1') for heating a substance inside a tank (100), the electric heater (1, 1') comprising: —at least one resistive wire (4) adapted to be connected to a source of electricity, said at least one resistive wire (4) being provided with a sheath (41) made of electrically insulating material; —at least a first thermally conductive sheet (5) made of metal fixed to the at least one resistive wire (4); —at least two protective layers (2, 3) made of polymer material, fixed to each other; wherein the at least one resistive wire (4) and the at least a first sheet (5) are arranged between the at least two protective layers (2, 3).

15 Claims, 2 Drawing Sheets

ELECTRIC HEATER FOR TANK

CROSS REFERENCE TO RELATED APPLICATION

This application claims benefit under 35 U.S.C. § 371 to international application No. PCT/IB2019/056196 filed on Jul. 19, 2019, which claims priority to Italian application No. 102018000007339 filed Jul. 19, 2018, the contents of which are incorporated by reference in their entireties.

FIELD OF THE INVENTION

The present invention relates to an electric heater for heating a substance, in particular a substance comprising water, contained in a tank, in particular the tank of a motor vehicle.

BACKGROUND ART

New technologies for saving fuel and reducing pollution in the automotive sector require tanks containing a liquid, particularly water, or an aqueous solution, such as an aqueous solution containing urea. The AdBlue® solution is an example of an aqueous solution comprising urea.

At low temperatures, e.g. about 0° C. for water and about −11° C. for some aqueous solutions, the liquid freezes and is therefore substantially unusable.

The frozen mass must be thawed quickly and in precise quantities to ensure the correct operation of the vehicle.

For thawing, especially for relatively large masses, it is not possible to use heating systems with an excessively high power concentration. Indeed, excessive overheating causes the mass to pass from the solid state directly into the gaseous state, i.e. a sublimation occurs.

This implies the formation of a gas layer which does not allow an effective thawing of the remaining part of the mass to be thawed. Furthermore, the gas may affect the operation of the system connected to the tank, because such a system is designed to operate with a liquid.

Heaters comprising a very thin coil, which requires elastomer layers in which it must be incorporated, are used in the tanks. The production process of such heaters is costly and complicated. Indeed, the elastomer layers must be cross-linked and the manufacture of the conductive track, in particular by chemical etching, also is complex and costly, especially if it is performed in an environmentally friendly manner.

The need is therefore felt to be able to heat a substance in a tank quickly, accurately and reliably using a heater which can be made in a simpler, more cost-effective and more environmentally-friendly manner.

SUMMARY OF THE INVENTION

It is an object of the present invention to provide an electric heater capable of effectively and quickly thawing a frozen mass or substance contained in a tank.

It is a further object of the present invention to provide such an electric heater which allows an optimal diffusion of heat.

It is another object of the present invention to provide such an electric heater which can be manufactured easily and cost-effectively, in particular without the need for elastomer support layers for the heating element.

It is a further object of the present invention to provide such an electric heater which can be manufactured in a manner which respects the environment.

The present invention achieves at least one of such objects, and other objects which will become apparent in light of the present description, by means of an electric heater, in particular for heating a substance inside a tank, the electric heater comprising at least one resistive wire adapted to be connected to a source of electricity to generate heat to heat said substance, said at least one resistive wire being provided with a sheath made of electrically insulating material; at least one first thermally conductive sheet made of metal fixed to the at least one resistive wire and at least two protective layers made of polymer material, fixed to each other, in particular sealed to each other;

wherein the at least one resistive wire and the at least one first sheet are arranged between the at least two protective layers.

According to an aspect, the invention also comprises a tank to contain a substance, in particular a substance comprising water, the tank comprising at least one electric heater according to any of the claims 1 to 12.

Since the heater comprises at least one resistive wire as a heating element, the manufacturing process for obtaining the heater is particularly easy and cost-effective.

In particular, no elastomer layers are required to support the heating element, because the resistive wire is already provided with an electrically insulating sheath.

Furthermore, the use of the resistive wire also offers considerable advantages in terms of versatility, because it can be easily arranged according to the areas to be heated.

Preferably, the electric heater comprises only one or more resistive wires as heating elements, i.e. as elements which produce heat by Joule effect. In particular, it is preferable that the electric heater does not comprise Joule-effect heating elements of different types, such as conductive foils or coils made, for example, by etching to form a track. The resistive wire may indeed be obtained in a simpler and more cost-effective manner as compared to such conductive foils and it is also easier to handle. By way of example, the resistive wire or heating wire can be made of copper, nickel or alloys thereof.

Advantageously, the resistive wire is provided with an electrically insulating sheath, lining or casing. This prevents the electric contact with the metal sheet or sheets and ensures the fluid-tight sealing, i.e. prevents the contact between the liquid in the tank and the metal core of the resistive wire or wires.

The sheath is preferably coaxial with the resistive wire. The sheath can be, for example, made of thermoplastic or thermosetting, either elastomer or non-elastomer material. For example, the sheath can be made of polyvinyl chloride (PVC), silicone, or thermoplastic elastomer, such as Santoprene.

The component comprising the sheath and at least one resistive wire is basically a heating cable.

Only one resistive wire or several resistive wires can be provided inside the sheath. Furthermore, a plurality of heating cables can be provided, in particular a plurality of heating cables each provided with a sheath inside which one or more resistive wires are provided. The one or more resistive wires can also be wound around an insulating core and the insulating core and the one or more resistive wires can be arranged inside the sheath.

Advantageously, the electric heater comprises at least one sheet or layer of thermally conductive material.

Advantageously, by providing at least one sheet of thermally conductive material, preferably made of metal, such as aluminum, it is possible to achieve an excellent heat distribution produced by the at least one resistive wire.

The at least one thermally conductive sheet can substantially be a continuous layer or it can be essentially in form of a mesh.

Advantageously, there are two layers or protective layers between which the at least one resistive wire and the at least one first thermally conductive sheet are arranged.

Advantageously, the two protective layers allow preserving the other components of the electric heater, which do not come into contact with the liquid in the tank.

Advantageously, the material of the electrically insulating layers can be selected according to the liquid which will be introduced into the tank.

Preferably, at least one of the two protective layers, e.g. one or both, is adapted to come into contact, in particular directly into contact, with the substance contained in the tank.

According to an aspect, the thickness of one or more components of the electric heater is selected to reduce thermal inertia, dimensions and costs.

Some of the additional advantages of the invention are listed below:

- the production process involves a low number of rejects;
- the electric heater is particularly adapted to heat a frozen mass subject to several freezing and thawing cycles;
- the electric heater is particularly resistant to mechanical stress, in particular to shocks and vibrations;
- the electric heating can operate at a voltage supplied by the car battery, for example at about 13 V.

Furthermore, according to a particular embodiment wherein a foil with fins is provided, the heat may be diffused as much as possible by conduction within the frozen mass. Indeed, the fins penetrate into the frozen mass, thus increasing the diffusion of heat by conduction. This aspect is particularly advantageous in view of the fact that conduction heating is more efficient and effective, particularly in terms of speed, as compared to convection and radiation, in order to achieve rapid thawing. Further features and advantages of the present invention will be more apparent in light of the detailed description of preferred, but not exclusive embodiments.

The dependent claims describe particular embodiments of the invention.

BRIEF DESCRIPTION OF THE DRAWINGS

The description of the invention refers to the accompanying drawings, which are provided by way of non-limiting example, in which.

The same references in the figures identify the same elements or components.

DETAILED DESCRIPTION OF EXAMPLE EMBODIMENTS OF THE INVENTION

Figure 1:
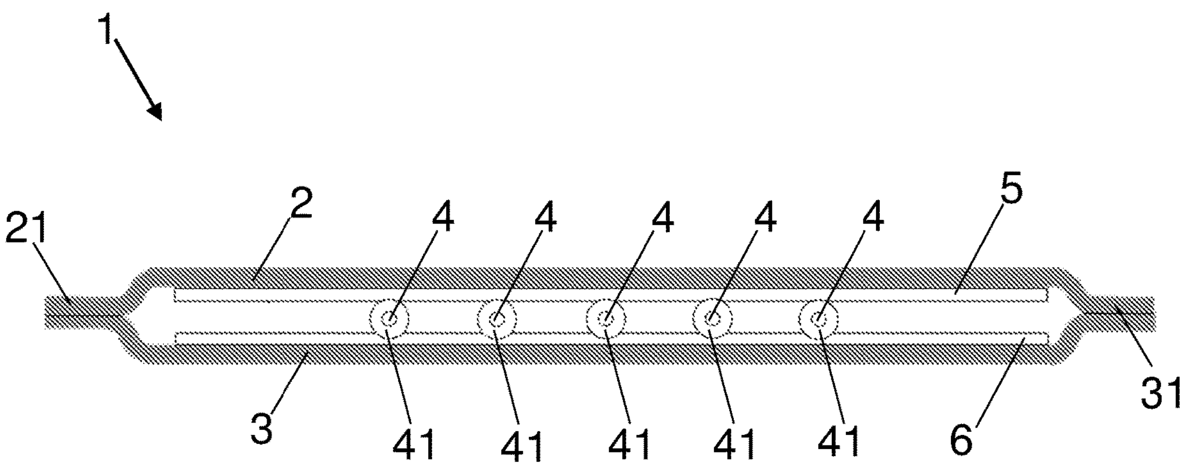
FIG. 1 diagrammatically shows a section view of an electric heater according to the invention.
Figure 2:
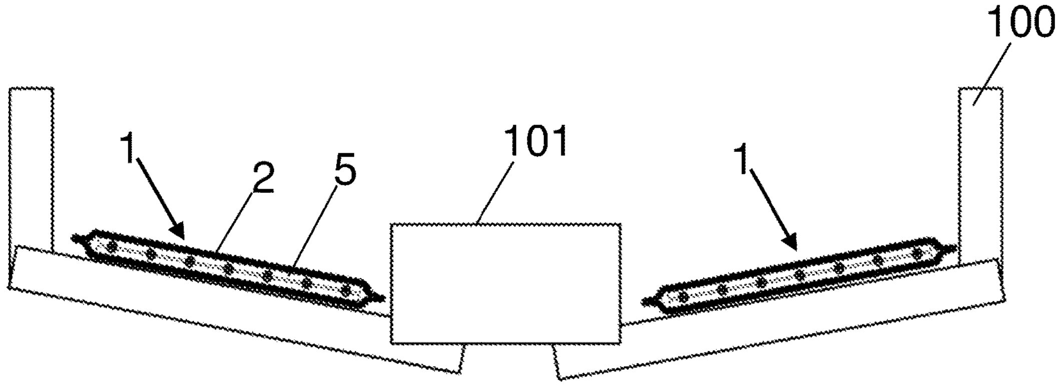
FIG. 2 diagrammatically shows a section view of part of a tank comprising at least one electric heater according to FIG. 1.

With reference to the Figures, it is described an electric heater 1, 1', in particular to heat a substance inside a tank 100, e.g. a tank for a water-injection system.

In all embodiments, the electric heater 1, 1' comprises:

- at least one resistive wire 4 adapted to be connected to a source of electricity to generate heat to heat the substance;
- at least one first thermally conductive material sheet 5, or foil or support, fixed to the at least one resistive wire 4.

The electric heater 1, 1' has a substantially sandwich structure.

The electric heater 1, 1' can comprise a single resistive wire 4 or further resistive wires can also be provided.

Preferably, the electric heater 1 comprises only one or more resistive wires 4 as heating elements, i.e. as elements which produce heat by Joule effect.

By way of example, the resistive wire 4 can be made of copper, nickel or alloys thereof.

Preferably, the resistive wire 4 has a circular or substantially circular cross-section.

Preferably, the resistive wire 4, in particular its metal core, has a diameter comprised between 0.04 and 0.5 mm.

Preferably, the length of the resistive wire 4 is between 500 mm and 3000 mm.

Preferably, the resistive wire 4 is folded or wound to form a path, e.g. in the shape of a serpentine.

Optionally, the resistive wire 4 comprises a number of substantially parallel stretches, preferably substantially rectilinear. Preferably, the successive stretches are joined together by a curved stretch.

Optionally, in a variant (not shown), the resistive wire, comprising the sheath 41, is wound around an insulating material support, which is preferably a flexible support.

The source of electricity to which the resistive wire 4 can be connected to generate heat is preferably the battery (not shown) of the motor-vehicle, which typically, but not exclusively, operates at a voltage of about 13 V. The connection with the battery is made, for example, by means of end portions (not shown) of the resistive wire 4. When the resistive wire 4 is crossed by electric current, it heats up by Joule effect. The heat is transferred to the at least one thermally conductive sheet, which in turn can transfer it either directly or indirectly to the mass to be thawed.

Preferably, the resistive wire 4 is configured to reach up to about 100° C., particularly when it is supplied by a voltage of about 13 V.

The resistive wire 4 is advantageously provided with the sheath 41 made of electrically insulating material.

Preferably, the sheath 41 and resistive wire 4 are a pre-assembled component, and in particular form a heating cable.

Preferably, the sheath 41 surrounds the resistive wire 4.

The sheath 41 is preferably in contact with the metal core of the resistive wire 4.

Preferably, the sheath 41 has a circular cross-section and is optionally coaxial with the resistive wire 4. The outer diameter of the sheath 41 is preferably constant and is between 1 and 5 mm.

The sheath 41 can be, for example, made of thermoplastic or thermosetting, either elastomeric or non-elastomeric material. For example, the sheath 41 can be made of polyvinyl chloride (PVC), silicone, or thermoplastic elastomer, such as Santoprene.

Preferably, the sheath 41 extends substantially along the entire length of resistive wire 4, preferably with the exception of the terminals of the resistive wire 4, which are used for the connection to the power source.

Optionally, the sheath 41 is an polymer extruded along the resistive wire 4.

Preferably, the electric heater 1, 1' further comprises a second sheet 6, or foil or support, of thermally conductive material fixed to the first sheet 5 and/or to the resistive wire 4.

Optionally, the first sheet 5 and the second sheet 6 are sealed to each other, so that the resistive wire 4 does not come into contact with the liquid contained in the tank.

Preferably, the first sheet 5 and the second sheet 6 (optional) are made of metal, preferably aluminum or aluminum alloy.

Preferably, the first sheet 5 and the second sheet 6 (optional) each have a thickness, preferably constant, between 0.009 mm and 1 mm. This selected range of thicknesses allows to optimally reduce the thermal inertia, dimensions and costs.

Furthermore, the sheet 5 and/or the sheet 6 are adequately flexible or deformable.

The first sheet 5 and the second sheet 6 have preferably the same size.

Preferably, the first sheet 5 and the second sheet 6 (optional) each form a continuous or substantially continuous layer. Alternatively, the first sheet 5 and the second sheet 6 (optional) are each made in the form of a mesh or net.

Preferably, the first sheet 5 and the second sheet 6 are two distinct elements, although it is instead possible to provide a single element shaped, e.g. folded, so as to comprise the two sheets or layers 5, 6.

Preferably, the first sheet 5 and the second sheet 6 are parallel to each other.

Preferably, the electric heater 1, 1' comprises two layers 2, 3, or protective layers, preferably of electrically insulating material, fixed to each other.

In this case, the at least one resistive wire 4, the at least one first thermally conductive sheet 5 and, when provided, the second thermally conductive sheet 6 are arranged between said at least two protective layers 2, 3.

In particular, the first thermally conductive sheet 5 is arranged between the resistive wire 4 and a first layer 2 of said two layers 2, 3 of electrically insulating material, and when the second sheet 6 is also provided, the latter is arranged between the resistive wire 4 and a second layer 3 of said two layers 2, 3.

The heat produced by the resistive wire 4 is transferred to the two layers 2, 3, of which at least one is adapted to come into contact with the mass to be thawed.

The two layers 2, 3 are preferably made of polymer material.

Preferably, the two layers 2, 3 are made of thermoplastic material, preferably polypropylene (PP) or of elastomer.

The two layers 2, 3 are preferably sheets or foils.

Preferably, the two layers 2, 3 each have a thickness, preferably constant, between 0.1 and 1 mm, so as to optimally reduce thermal inertia, space requirements and costs.

Preferably, the two layers 2, 3 substantially have the same dimensions.

Preferably, the total thickness of the electric heater 1, 1' is from 2 to 10 mm.

Preferably, the electric heater 1, 1' has a surface extension, i.e. width×length, between 10000 $mm^2$ and 1000000 $mm^2$.

Such a surface extension substantially corresponds to the surface extension of the thermally conductive sheet 5 and/or the surface extension of one of the two layers 2, 3.

Preferably, the two layers 2, 3 are substantially sealed to each other, so as to prevent the liquid contained in tank 100 from penetrating into the electric heater 1, 1', in particular preventing the sheet 5 and the resistive wire 4 provided with sheath 41 (and the sheet 6, when provided) from coming into contact with the liquid, i.e. the substance contained in the tank.

Preferably, at least or only the peripheral edges 21, 31 or perimeter edges, of the two layers 2, 3 are fixed, in particular sealed, to each other. Furthermore, optionally, the central portions, surrounded by the peripheral edges 21, 31 of the two layers 2, 3 and optionally also the sheets 5, 6, are mutually spaced apart. It is worth noting that that the portions of sheets 5, 6 in which no resistive wire 4 is provided may also be in contact with each other or be slightly spaced apart.

Preferably, the two layers 2, 3 are at least partially parallel to each other. For example, the peripheral edges 21, 31 are parallel to each other and preferably also the central portions are parallel to each other. Preferably, the thermally conductive sheet 5, preferably also the sheet 6 when provided, is parallel to the two layers 2, 3, in particular to their central portions.

When only one thermally conductive sheet 5 is provided, preferably the resistive wire 4, in particular the sheath 41, is in contact, in particular directly in contact, with one of the two layers 2, 3 and with the sheet 5. In particular, in this case, the sheath 41 is in contact with the layer 3, which is opposite to the layer 2 provided with the sheet 5. Alternatively, when two thermally conductive sheets 5 and 6 are provided, preferably the resistive wire 4, in particular the sheath 41, is in contact, in particular directly in contact, with the two thermally conductive sheets 5 and 6. The resistive wire 4 is indeed arranged between the two sheets 5, 6.

Preferably, the sheet 5 is in contact, in particular directly in contact, with layer 2 and, when the sheet 6 is also provided, it is in contact, in particular directly in contact, with the layer 3.

Optionally, but not exclusively, the sheet 5 is fixed to the layer 2, e.g. the sheet 5 is glued or heat-sealed to the layer 2; and/or the sheet 6, when provided, is fixed to the layer 3, e.g. the sheet 6 is glued or heat-sealed to the layer 3.

Figure 3:
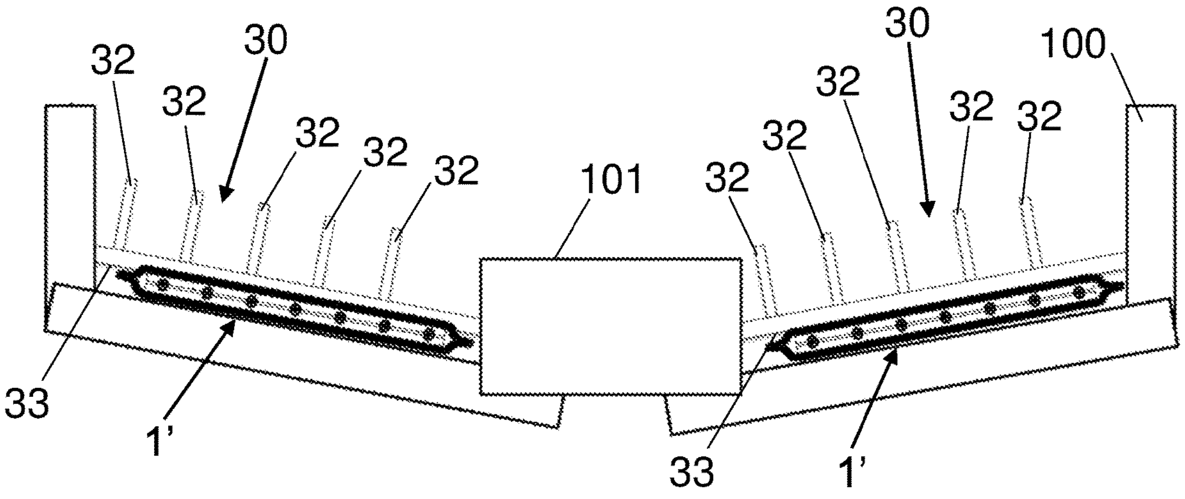
FIG. 3 diagrammatically shows a side view of a further portion of a tank comprising at least one electric heater according to an embodiment of the invention.

According to a particular embodiment (FIG. 3), the heater 1' also comprises an element, in particular a foil 30, made of thermally conductive material adapted to come into contact with the mass to be thawed. The foil 30 has a base 33, or surface, fixed to the outer face of one of the two layers 2, 3, e.g. layer 2. Alternatively, in a variant (not shown), the foil 30 can be fixed to the outer face of the thermally conductive foil 5.

The foil 30 comprises a plurality of fins 32. In particular, the fins 32 are defined by foil portions etched and folded transversally to said surface 33.

Each fin 32 corresponds to an opening of the foil 30, in particular of the base 33. At each opening, particularly underneath, there is one of the two electrically insulating layers 2, 3, e.g. layer 2.

In other words, the fins 32 are part of the foil 30, and in particular are folds of the foil 30. For example, the fins 32 form an angle preferably of about 90° with the respective base 33 underneath.

Preferably, the thickness of the foil 30, i.e. of the base 33 and of each of the fins 32, is between 0.2 and 3 mm, e.g. between 0.3 and 2 mm. The thickness of the foil 30 is preferably constant.

The foil 30 is preferably made of metal, preferably aluminum or aluminum alloy, which is a good heat conductor.

The invention further comprises a tank 100 to contain a substance, in particular a substance comprising water, provided with at least one electric heater 1, 1'.

The tank 100 is preferably the tank of a motor vehicle. In particular, the tank 100 is adapted to contain a liquid, e.g. water or an aqueous solution, e.g. such as an aqueous solution comprising urea. The tank 100 is preferably adapted to be connected to a system (not shown) for saving fuel and reducing pollution of the vehicle.

In the illustrated embodiments, the tank 100 comprises two electric heaters 1 or 1', although only one electric heater 1 or 1', or more than two electric heaters 1 or 1' can be provided.

Each electric heater 1, 1' is fixed to the tank 100.

In particular, for each electric heater, 1, 1' a first layer, e.g. layer 2, of said two layers 2, 3 of electrically insulating material is adapted to come into contact with said substance to heat it. The other layer 3, i.e. the second layer, is fixed to an inner wall of the tank 100. Preferably, such an inner wall is a bottom wall of the tank 100.

When only one thermally conductive sheet 5 is provided, it is preferably distal from the inner wall of the tank 100 to which the electric heater 1, 1' is fixed.

When the two layers 2, 3 are not provided, a thermally conductive sheet 5, 6 and/or the resistive wire 4 is fixed directly to the inner wall of the tank.

When the foil 30 is provided, the fins 32 extend towards the inside of the tank 100, i.e. towards the mass to be thawed.

Typically, but not exclusively, the bottom wall of tank 100 has an opening with which a distribution module, also referred to as an injection module or distributor 101, is associated. A pump for the liquid (not shown) can be connected to the distribution module 101. The distributor 101, in particular the pump, is preferably used to draw the liquid from the tank.

Preferably, two or more heaters 1 or 1' are arranged on the sides of the distributor 101, e.g. at opposite sides.

Alternatively, a single heater 1' or 1' can be provided which extends around the distributor 101 and, for example, the single heater 1' or 1' can be substantially shaped as a circular crown or ring when viewed from above.

An example of process to obtain an electric heater 1, 1' comprises a step in which at least one resistive wire 4, provided with sheath 41, is fixed to the at least one thermally conductive sheet 5.

For example, a process to obtain an electric heater 1, 1' provided with the two protective layers 2, 3, comprises the following steps:

(a) fixing at least one resistive wire 4 to at least one thermally conductive sheet 5;

(b) arranging the at least one resistive wire 4 and the first sheet 5 between the two layers 2, 3 of electrically insulating material;

(c) securing the two layers 2, 3 of electrically insulating material to each other.

In all embodiments, preferably, the at least one resistive wire 4, in particular the sheath 41, can be fixed to the first sheet 5 of thermally conductive material and/or to the second layer 3, or to the first sheet 5 and/or to the second sheet 6 by heat-sealing, gluing or sewing, or can only be retained by fixing the two layers 2, 3.

When the electric heater 1' comprises also the foil 30, in general, there is also a step of fixing the foil 30 to one of the two layers 2, 3 or to the thermally conductive foil 5 if the two layers 2, 3 are not provided.

The fins 32 of the foil 30 can be obtained by cutting portions of foil by etching and then folding the etched portions transversely to the surface 33.

The invention claimed is:

1. An electric heater for heating a substance inside a tank, the electric heater comprising at least one resistive wire adapted to be connected to a source of electricity, said at least one resistive wire being provided with a sheath made of electrically insulating material;

at least one first thermally conductive sheet made of metal fixed to the at least one resistive wire;

at least two protective layers made of polymer material, fixed to each other;

wherein the at least one resistive wire and the at least one first thermally conductive sheet are arranged between the at least two protective layers.

2. The electric heater according to claim 1, comprising at least one second thermally conductive sheet made of metal fixed to the at least one first thermally conductive sheet and/or to the at least one resistive wire;

wherein the at least one resistive wire is arranged between the at least one first thermally conductive sheet and the at least one second thermally conductive sheet.

3. The electric heater according to claim 1, wherein the at least one first thermally conductive sheet is made of aluminum or aluminum alloy.

4. The electric heater according to claim 1, wherein the at least one first thermally conductive sheet has a thickness between 0.009 mm and 1 mm.

5. The electric heater according to claim 2, wherein the at least one resistive wire, the at least one first thermally conductive sheet and the at least one second thermally conductive sheet are arranged between said at least two protective layers.

6. The electric heater according to claim 1, wherein the at least two protective layers each have a thickness between 0.1 and 1 mm.

7. The electric heater according to claim 1, wherein the at least two protective layers are made of a thermoplastic material, preferably polypropylene.

8. The electric heater according to claim 1, wherein said sheath has an outer diameter between 1 and 5 mm and/or wherein said sheath surrounds said at least one resistive wire.

9. The electric heater according to claim 1, wherein said sheath is in contact with said at least one first thermally conductive sheet and with a protective layer of said at least two protective layers; or wherein, a second thermally conductive sheet is provided, and said sheath is in contact with said at least one first thermally conductive sheet and with said second thermally conductive sheet.

10. The electric heater according to claim 1, wherein the at least one resistive wire has a diameter between 0.04 and 0.5 mm and/or wherein the at least one resistive wire comprises a plurality of first stretches which are substantially parallel to each other, preferably substantially rectilinear, and preferably wherein two first successive stretches are joined by a respective second curved stretch.

11. The electric heater according to claim 1, having a total thickness between 2 and 10 mm.

12. The electric heater according to claim 1, comprising a foil of thermally conductive material, adapted to come into contact with said substance, having a base fixed to an outer face of the at least one first thermally conductive sheet or fixed to a layer of said at least two protective layers; said foil (30) comprising a plurality of fins defined by portions of foil cut and folded transversely to said base.

13. A tank for containing a substance, in particular a substance comprising water, the tank comprising at least one electric heater according to claim 1.

14. A The tank according to claim 13, wherein said at least one electric heater comprises at least one second thermally conductive sheet fixed to the at least one first thermally conductive sheet; and wherein the at least one resistive wire is arranged between the at least one first thermally conductive sheet and the at least one second thermally conductive sheet.

15. A The tank according to claim 14, wherein wherein the at least one resistive wire, the at least one first thermally conductive sheet and, the at least one second thermally conductive sheet of said at least one electric heater are arranged between said at least two protective layers;

wherein a first layer of said at least two protective layers is fixed to an inner wall of the tank, preferably said inner wall being a bottom wall of the tank, and preferably wherein a second layer of said at least two protective layers is adapted to come into contact with said substance to heat it.

* * * * *